Nov. 4, 1924.
D. F. McCLELLAN
STORE FIXTURE OR EQUIPMENT
Filed Nov. 16, 1923
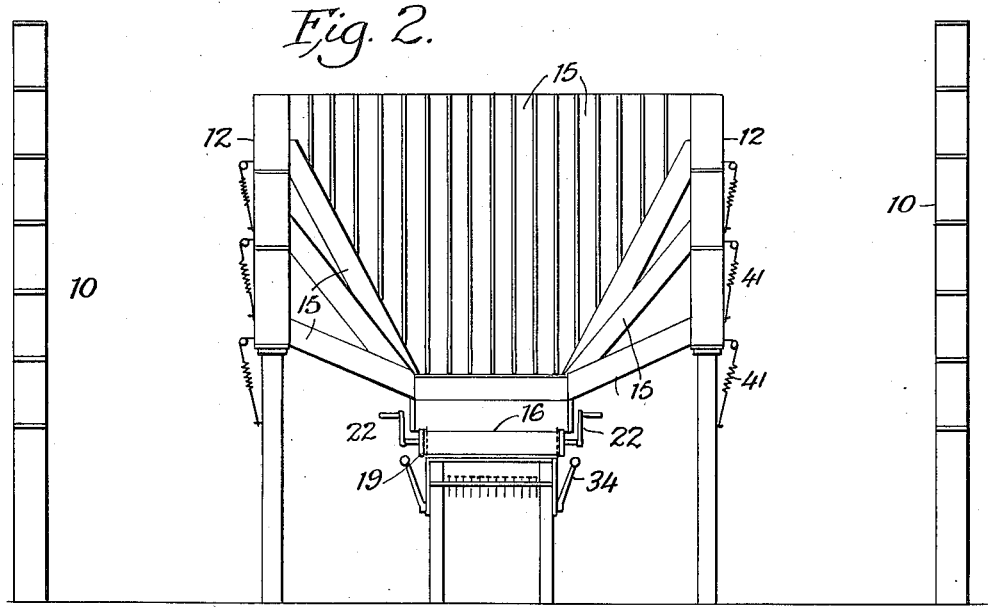
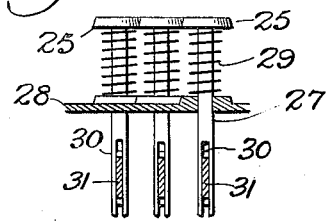
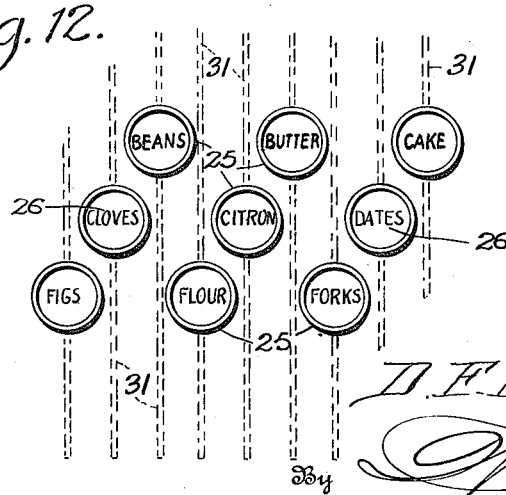

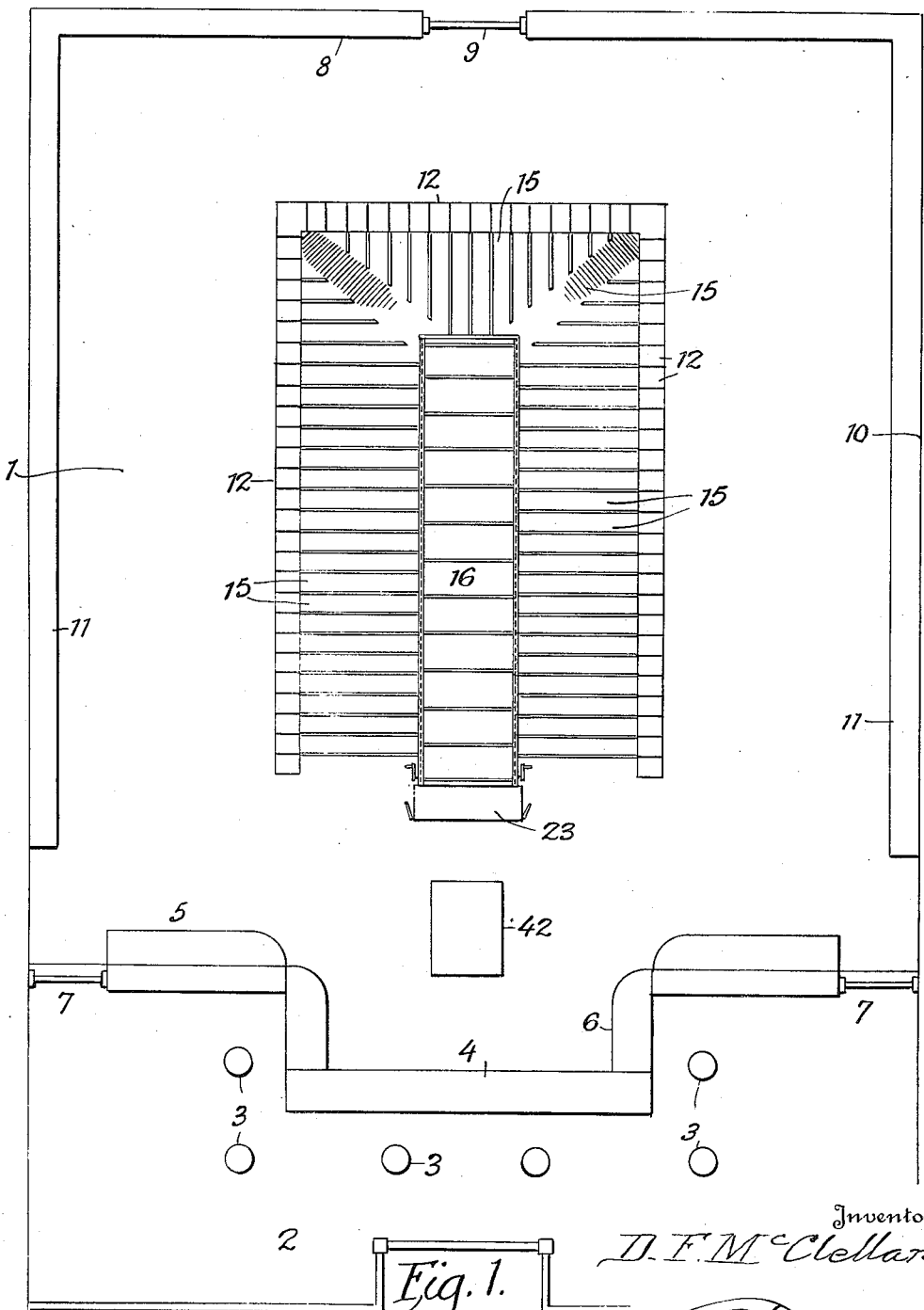

Nov. 4, 1924.
D. F. McCLELLAN
1,514,389
STORE FIXTURE OR EQUIPMENT
Filed Nov. 16, 1923    5 Sheets-Sheet 3
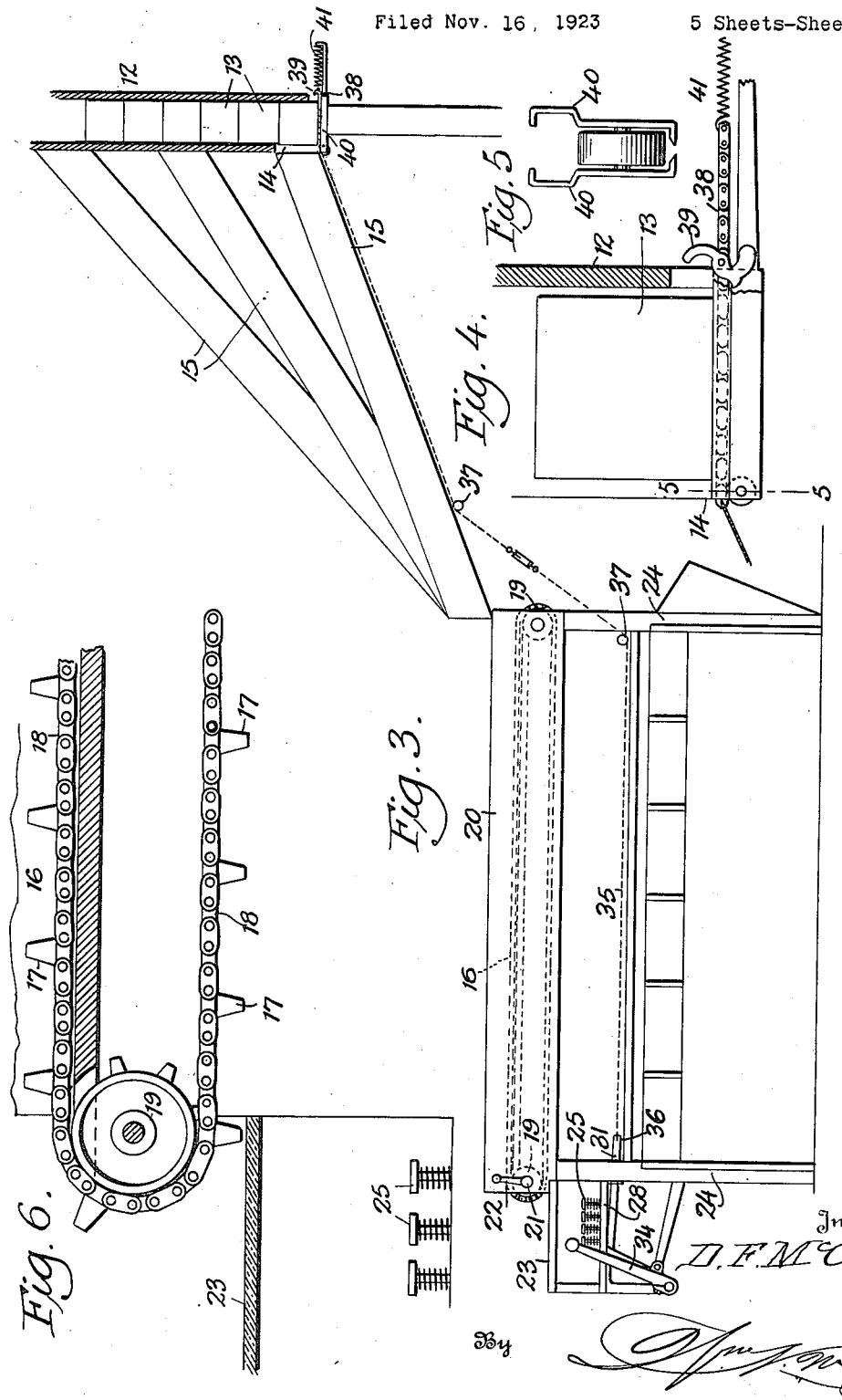

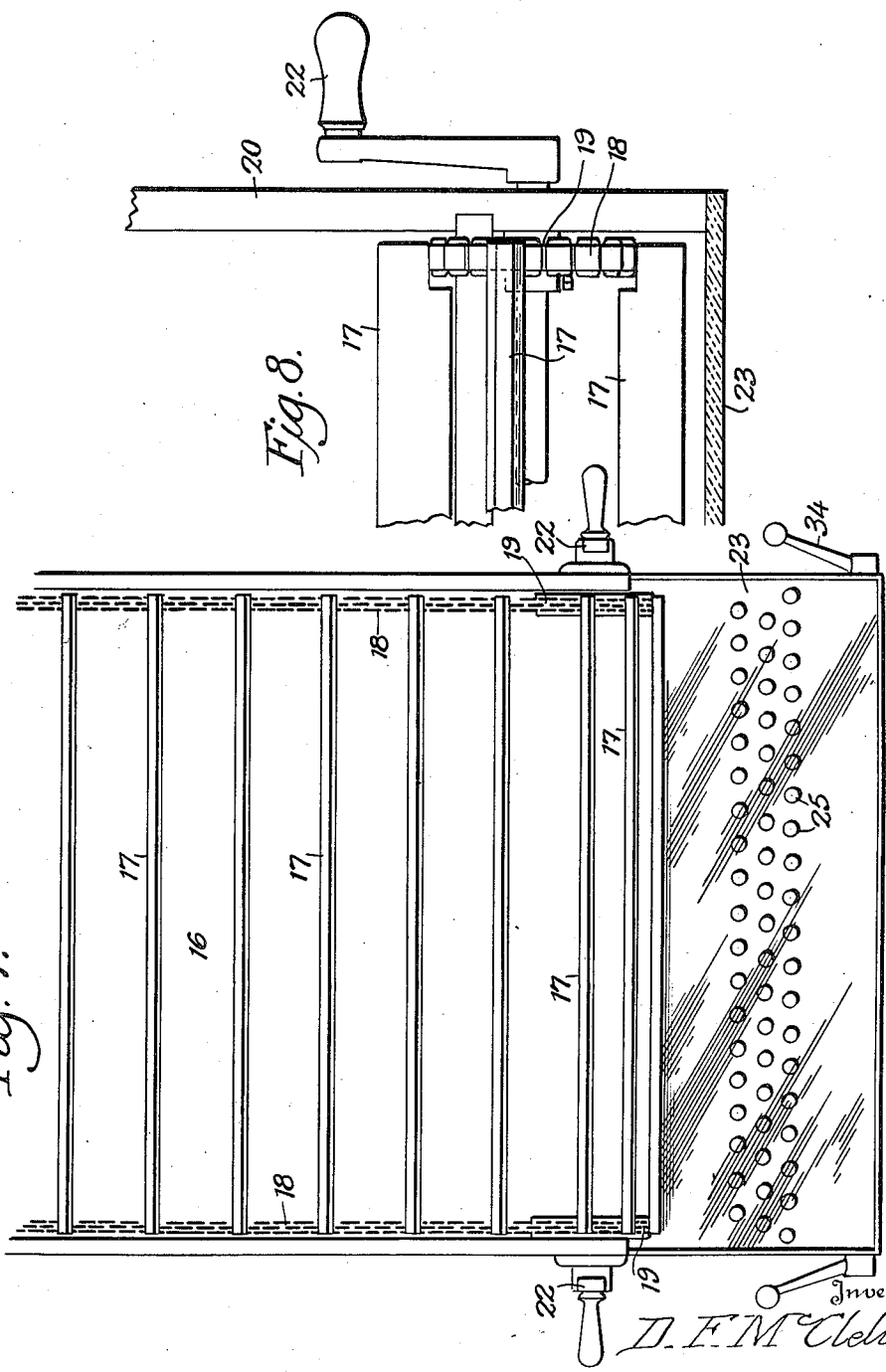

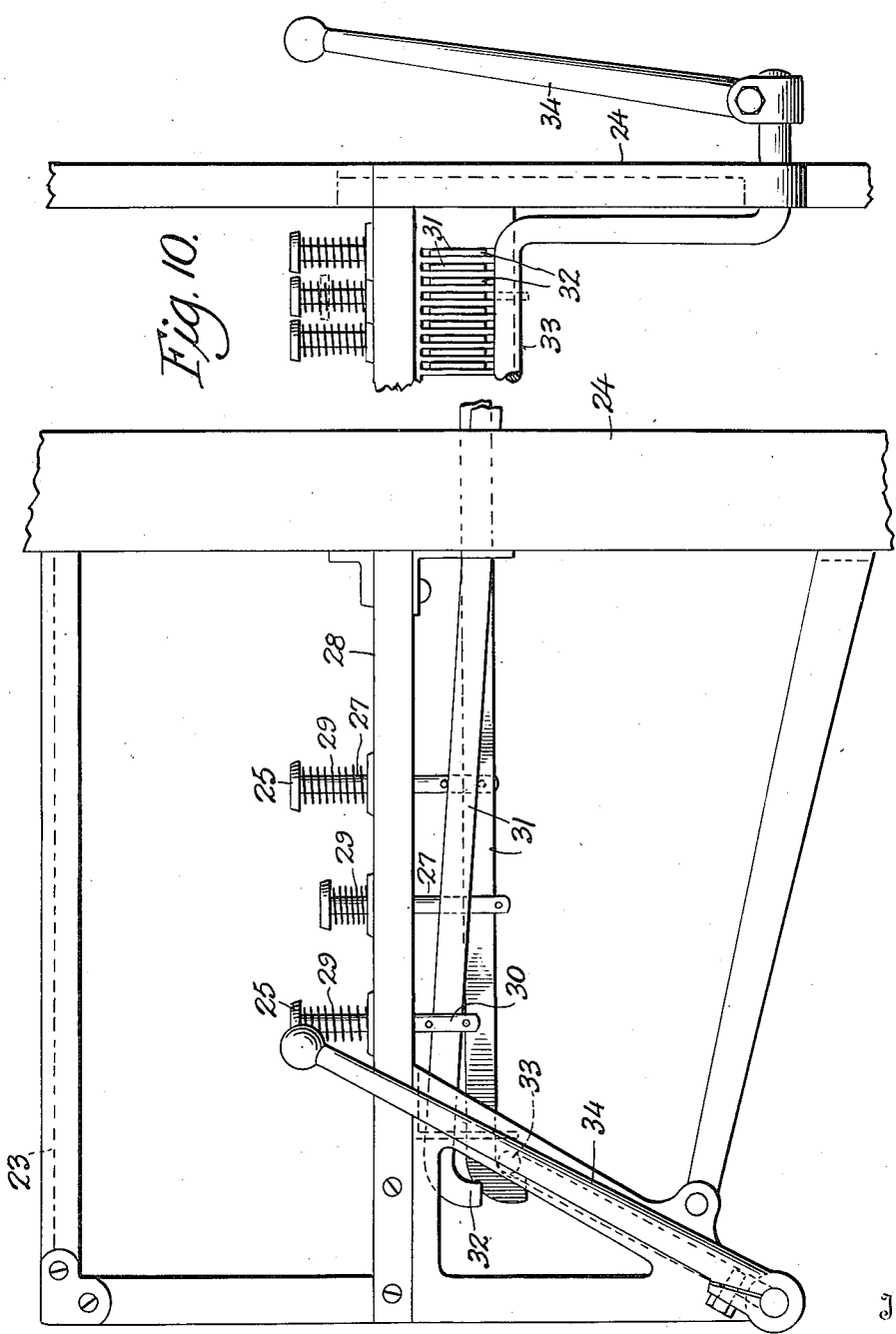

Patented Nov. 4, 1924.

1,514,389

UNITED STATES PATENT OFFICE.

DURBEY FRANCIS McCLELLAN, OF NASHVILLE, TENNESSEE.

STORE FIXTURE OR EQUIPMENT.

Application filed November 16, 1923. Serial No. 675,169.

*To all whom it may concern:*

Be it known that I, DURBEY F. MCCLELLAN, a resident of Nashville, in the county of Davidson and State of Tennessee, a citizen of the United States, have invented certain new and useful Improvements in Store Fixtures or Equipments, of which the following is a specification.

My invention relates to improvements in store fixtures or equipment and one object of my invention is the provision of fixtures or equipment which will produce a layout which will provide very large storage and service accommodation in a comparatively small amount of space.

Another object of my invention is the production of store fixtures or equipment which will greatly reduce the overhead and operating expenses and will permit a very rapid and efficient service or selling of the articles.

Another object of my invention is the provision of a store service equipment which can be rapidly and practically operated by one or two assistants and serve the goods in a rapid and efficient manner.

Another object of my invention is the production of store service equipment which will instantly supply the required articles for the purchaser and which will comprise few and simple parts capable of withstanding hard usage without getting out of order.

Another object of my invention is the provision of a store service layout or equipment which will place the goods or merchandise in the most desirable place for quick and efficient service and which will form a proper protection and storage for such goods or merchandise.

Another object of my invention is the provision of a store service layout or equipment which will have large capacity in a small compass, which can be installed at a very convservative figure, which will overcome objections and defects in fixtures in present use and will prove thoroughly efficient, desirable and practical from every point of view.

To attain the objects stated, and such others as inhere in an improvement of this character, my invention consists of a layout or equipment embodying novel features of construction, combination and arrangement of parts substantially as disclosed herein, it being understood that any changes may be made in my invention which fall within the scope of my claims.

In order that the details of construction and the operation of my improvement may be fully understood and its many features of merit and advantages be appreciated, I have shown in the accompanying drawings a store service layout constructed according to my invention, and in said drawings:

Figure 1 represents a top plan view of a complete store layout or equipment embodying my invention.

Fig. 2 represents a front end elevation of the complete layout or equipment.

Fig. 3 represents a side elevation on a somewhat enlarged scale of the layout or equipment.

Fig. 4 represents an enlarged detail view of a portion of the merchandise ejecting mechanism.

Fig. 5 represents a sectional view on the line 5—5 of Fig. 4.

Fig. 6 represents an enlarged detail view of a portion of the endless carrier, the merchandise receiving platform, and the keys for selecting the desired goods.

Figs. 7 and 8 represent detail views on an enlarged scale of the endless carrier and operating mechanism.

Figures 9 and 10 represent enlarged detail views of the mechanism for selecting and expelling the goods or merchandise.

Figures 11 and 12 represent detail views of the operating keys and a portion of the keyboard, respectively, to illustrate more minutely certain details.

Referring by numeral to the drawings, in which the same numbers of reference are used to indicate the same parts in all the views of the drawings:—

The numeral 1 designates the floor plan of my layout, which is of rectangular shape and is provided with the front chamber or compartment 2, in which may be placed a series of stools or seats 3, for the accommodation of customers, while adjacent thereto are the counters 4, 5, and 6, and the doors or gateways 7, which lead to the interior 1 of said layout, the said interior 1 being inclosed by the rear wall 8, having a door or window 9 and provided with the side walls 10, constructed with shelves 11, to provide a storage or supply means, thus permitting the storage of a vast amount of merchandise in the most accessible position or location.

The main portion or fixtures of my layout is disposed within the space 1 and is of extremely simple construction, comprising the series of vertical containers 12, arranged in a rectangular formation to receive the cans or packages 13 of the goods or merchandise. The vertical containers 12 are provided at their lower portions to one side with the outlet or discharge opening 14, such openings or outlets 14 of the containers communicating or registering with the upper receiving end of the inclined delivering chutes 15. This construction is most plainly seen in Fig. 3, and the series of chutes 15 are arranged at different inclines and receive the merchandise in can or package form from the different containers 12, and all of said chutes 15 lead to the endless chain or carrier 16, which consists of the series of bars or cross strips 17 and links 18, traveling over the wheels 19, mounted in each end of the side rails 20, the shaft of the inner wheel 19 being extended at 21, to receive a crank 22 for causing the chain or carrier to travel by manual turning of the crank 22.

From this construction, it will be apparent that the merchandise in cans or packages is placed in the series of vertical supply containers and is delivered from said containers to the chutes 15 and thence to the endless carrier which is operated manually by the attendant turning the crank 22, which action causes the goods to be delivered to the glass receiving platform 23.

The side rails and receiving platform are mounted upon a suitable framework 24, and below the receiving platform 23, which is preferably made of glass, are placed the series of keys 25, which are provided with designations 26, to indicate the goods to be selected. These keys have their stems 27 movable in the plate 28 and provided with returning springs 29, and further have their lower portions 30 slotted or bifurcated to fit upon the levers 31. These levers 31 are provided at one end with a hook 32, which upon depression of the desired key 25, will cause said hooked end to engage the cross rod 33, connected to the hand levers 34, secured to each end of said rod 33, to permit manual operation from either side, to move said hooked lever 31 and draw upon the chain or connection 35 connected at 36 to the inner end of said lever, and passing over guides 37, to pull inward the slide 38, having the hook 39 to engage the can or package of merchandise 13 and force it into the desired delivering chute 15, as seen most clearly in Figs. 3 and 4. The said slides 38 are mounted to travel in guides 40 and are provided with returning spring 41.

From the foregoing description, taken in connection with the drawings, the construction in detail and the operation of my layout will be readily understood, and the goods or merchandise in canned or package form are placed in the vertical supply containers, with the lower package in each container in register with the outlet of said container and the upper open receiving end of the respective delivery chute; now upon depression of the desired key by the attendant, the required hooked arm or lever will be brought into contact with the rod 33 and either handle or lever 34 will be drawn upon and through its connection with the desired hooked arm will pull upon the cord operating the ejecting means, which will throw the desired can or package into the chute and from thence to the endless carrier, where it will be delivered to the receiving platform and thence passed to the bundle wrappers' counter 42, as will be readily apparent.

The store equipment or layout herein shown and described will overcome the defects and objections found to exist in present structures of this character and provide an equipment which will be inexpensive to install; which will arrange and dispose the goods or merchandise in the most desirable and practical manner; which will have a large storage and service accommodation in a comparatively small space; which can be easily controlled and operated by only one or two attendants, thus greatly reducing overhead and operating expenses, and that generally the improvements contain the requisite to commend the layout as highly desirable, efficient and practical.

I claim:

1. A store layout or equipment, embodying a main enclosure, an enclosure for customers, and a storing and service structure within said main enclosure, said service structure consisting of a series of vertically disposed containers, a series of delivery chutes leading from said containers, and an endless conveyor in communication with all of said chutes for delivering the merchandise therefrom.

2. A store or layout equipment, embodying a main enclosure, an enclosure adjacent thereto for customers, a storage structure in the side walls of the main enclosure, and a storing and service structure within said main enclosure, said service structure consisting of a series of vertically disposed containers, a series of delivery chutes leading from said containers, and an endless conveyor in communication with all of said chutes for delivering the merchandise therefrom.

3. A store layout or equipment, consisting of a series of supply containers, delivery chutes leading from said containers, an endless conveyor in communication with all of said delivery chutes for conveying the goods, and means for selectively projecting the goods from any one of said supply containers.

4. A store layout or equipment, consisting of a series of vertical supply containers having each a discharge or outlet, delivery chutes leading from the outlets of said containers, an endless conveyor in communication with all of said delivery chutes for conveying the goods, and means for selecting and projecting the goods from any one of said containers.

5. A store layout or equipment, consisting of a series of vertical supply containers having each a discharge or outlet, delivery chutes leading from the outlets of said containers, a spring slide for engaging and projecting the goods in can or package form from the containers to the delivery chutes, and an endless carrier for conveying the goods from said chutes.

6. A store layout or equipment, consisting of a series of vertical supply containers having each a discharge outlet, delivery chutes leading from said outlets, an endless carrier for delivering the goods from said chutes, keys connected to expel the desired goods from the container to the delivery chutes, and means for returning said keys and connections to normal position.

7. A store layout or equipment consisting of a series of vertical supply containers arranged in rectangular outline and each having a discharge outlet, a series of delivery chutes extending inward from the outlets of said containers, an endless manually operated carrier within the space formed between the containers and chutes and in communication with the lower ends of all of said chutes, and manually operated means for projecting the goods or merchandise from the desired container to the desired chute.

8. In a store layout or equipment, the combination with a series of vertical supply containers having each a discharge opening, a spring-controlled slide having means to engage and project said goods from the outlets of said containers, connections leading from said spring-controlled slide, a key connected with said slide through flexible means, and a rod adapted to be engaged through the operation of said key to draw upon said slide and project the desired merchandise.

9. A store layout or equipment, consisting of a series of supply containers having each a discharge outlet, a series of inclined delivery chutes leading from said outlets, a frame arranged near the discharge ends of said chutes, an endless carrier mounted and adapted to travel in said frame and in communication with the lower discharge ends of said chutes, means for manually operating said endless carrier, a receiving platform in communication with said carrier, a series of keys in proper relation to said carrier and platform, a series of sliding arms adapted to be moved downward by the depression of said keys, hooks on said sliding arms, a rod adapted to be rocked in the frame manually to engage one of the hooks on said arms, a spring-controlled ejector mounted in each of said supply containers in the outlet thereof, and connections between said arms and ejectors for operating said ejectors, and means for restoring the keys, arms and ejectors to normal position.

In testimony whereof I hereunto affix my signature.

DURBEY FRANCIS McCLELLAN.